(12) United States Patent
Suzuki et al.

(10) Patent No.: US 7,806,751 B2
(45) Date of Patent: Oct. 5, 2010

(54) METHOD OF MANUFACTURING DISK SUBSTRATE

(75) Inventors: Tetsuo Suzuki, Tokyo (JP); Yoshio Kawakami, Saitama (JP); Kazuhiro Nakiri, Shizuoka (JP)

(73) Assignees: The Furukawa Electric Co., Ltd., Tokyo (JP); Shoda Techtron Corp., Hamamatsu-shi (JP)

( * ) Notice: Subject to any disclaimer, the term of this patent is extended or adjusted under 35 U.S.C. 154(b) by 0 days.

(21) Appl. No.: 12/337,205

(22) Filed: Dec. 17, 2008

(65) Prior Publication Data

US 2009/0104853 A1  Apr. 23, 2009

Related U.S. Application Data

(63) Continuation of application No. PCT/JP2007/072203, filed on Nov. 15, 2007.

(30) Foreign Application Priority Data

Nov. 15, 2006 (JP) .............................. 2006-309637

(51) Int. Cl.
   *B24B 1/00* (2006.01)
(52) U.S. Cl. .............................. 451/44; 451/57; 451/58
(58) Field of Classification Search .................... 451/43, 451/44, 51, 52, 57, 58, 61, 177, 178, 180, 451/190, 194
See application file for complete search history.

(56) References Cited

U.S. PATENT DOCUMENTS

| 3,683,885 A | * | 8/1972 | Kikuchi | 125/11.03 |
| 4,063,471 A | * | 12/1977 | Nowak | 76/112 |
| 4,228,617 A | * | 10/1980 | Bando | 451/5 |
| 4,535,570 A | | 8/1985 | Ochiai et al. | |
| 4,862,868 A | * | 9/1989 | Dodd et al. | 125/11.03 |
| 4,991,353 A | * | 2/1991 | Wiener | 451/11 |
| 5,099,617 A | * | 3/1992 | Bovone | 451/44 |
| 5,149,337 A | * | 9/1992 | Watanabe | 451/43 |
| 5,327,686 A | * | 7/1994 | Park | 451/1 |
| 6,752,699 B2 | * | 6/2004 | Yanagisawa et al. | 451/56 |
| 2003/0017789 A1 | * | 1/2003 | Yanagisawa et al. | 451/53 |

FOREIGN PATENT DOCUMENTS

| JP | 59-7562 | 1/1984 |
| JP | 9-181021 | 7/1997 |
| JP | 10-329037 | 12/1998 |
| JP | 2001-129750 | 5/2001 |
| JP | 2002-355740 | 12/2002 |
| JP | 2003-231044 | 8/2003 |
| JP | 2004-50345 | 2/2004 |

OTHER PUBLICATIONS

U.S. Appl. No. 12/249,341, filed Oct. 10, 2008, Suzuki, et al.

* cited by examiner

*Primary Examiner*—Timothy V Eley
(74) *Attorney, Agent, or Firm*—Oblon, Spivak, McClelland, Maier & Neustadt, L.L.P.

(57) ABSTRACT

A method of manufacturing a disk substrate includes a disk substrate forming step of forming a disk substrate; and an outer chamfering step of chamfering an outer edge of the disk substrate. The outer chamfering step includes chamfering the outer edge by bringing an end surface of a cylindrical-shaped outer chamfering grindstone having a hollow portion on its end into contact with the outer edge such that the hollow portion faces the outer edge while rotating each of the outer chamfering grindstone and the disk substrate.

6 Claims, 7 Drawing Sheets

METHOD OF MANUFACTURING DISK SUBSTRATE

CROSS-REFERENCE TO RELATED APPLICATIONS

This application is a continuation of PCT/JP2007/072203 filed on Nov. 15, 2007, the entire content of which are incorporated herein by reference.

BACKGROUND OF THE INVENTION

1. Field of the Invention

The present invention relates to a method of manufacturing a disk substrate made of semiconductor, glass, or the like.

2. Description of the Related Art

In recent years, compact information terminal devices, such as cell-phones or portable music players, including a high-capacity hard disk drive have been developed. There is a need to increase a capacity of a magnetic disk that is a recording medium used in a hard disk drive and to reduce a size of the magnetic disk. To meet such a need, a glass substrate has been used as a substrate of a magnetic disk used in a hard disk drive instead of a conventional aluminum alloy substrate. Furthermore, such substrates are generally used in, for example, silicon monocrystal wafers that are used in manufacturing semiconductor devices.

A glass substrate used in the above applications is formed into a circular shape (a disk), or a circular shape having a circular hole at its center. However, inner and outer edges of the glass substrate can be easily damaged due to an internal stress or an external factor such as a physical contact. Therefore, a chamfering process is performed on the glass substrate to chamfer the inner and outer edges of the glass substrate. For example, Japanese Patent Application Laid-open No. 2003-231044 discloses such a processing technology for chamfering a glass substrate.

Figure 10:
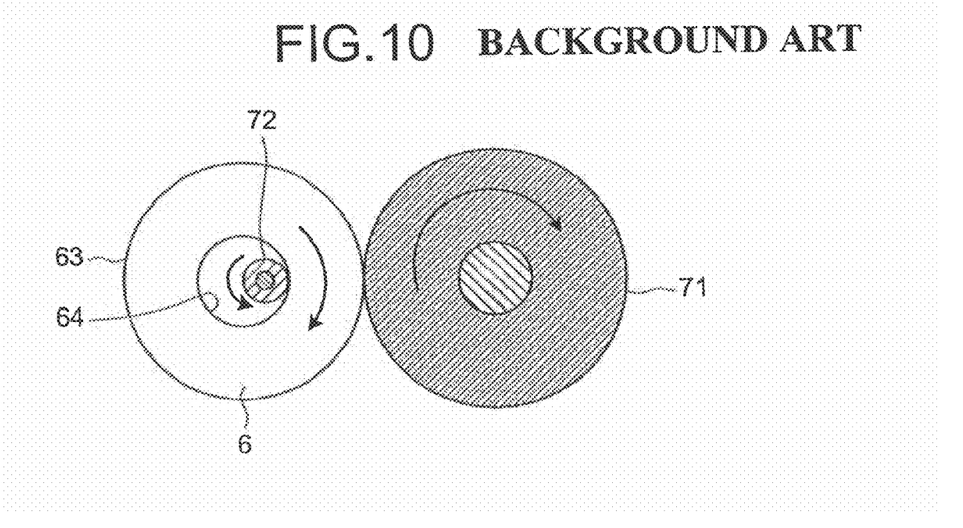
FIG. 10 is a diagram illustrating a conventional method of chamfering a glass substrate.
Figure 11:
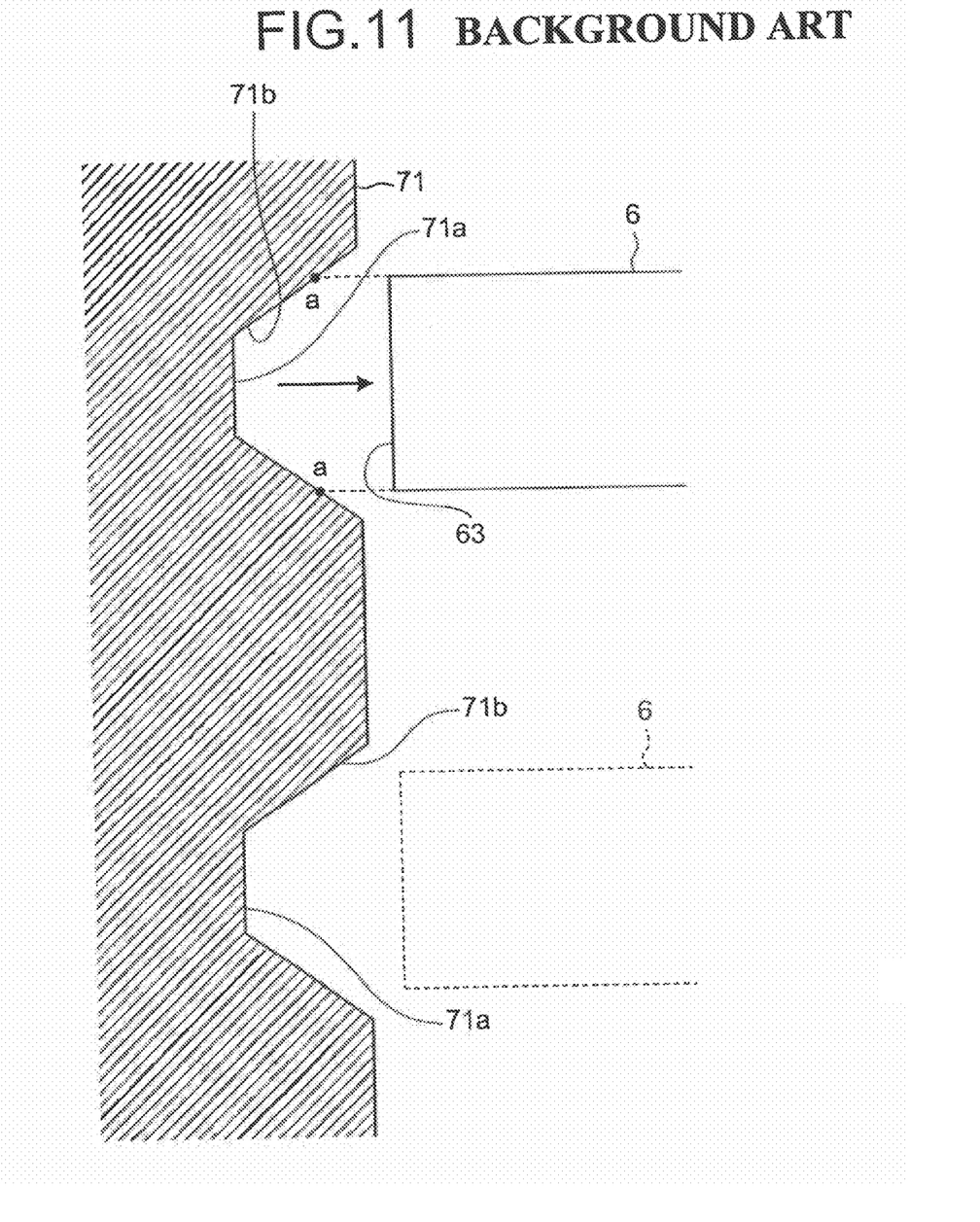
FIG. 11 is a cross-sectional view of grinding grooves of a rotary grindstone used in the conventional method of chamfering a glass substrate.

In Japanese Patent Application Laid-open No. 2003-231044, as shown in FIG. 10, a disk-shaped glass substrate 6 having a circular hole at its center is rotated, and an outer end surface 63 and an inner end surface 64 of the glass substrate 6 are pressed against outer surfaces of cylindrical rotary grindstones 71, 72. As shown in FIG. 11, a plurality of grinding grooves 71a is formed over the entire outer surfaces of the rotary grindstones 71, 72. A tapered surface 71b is formed on the grinding groove 71a such that a width of the grinding groove 71a becomes narrower toward the inner side of the grinding groove 71a. Abrasive grain, such as diamond abrasive grain, is adhered on the inner surface of the grinding groove 71a. The tapered surfaces 71b of the grinding grooves 71a make contact with the outer end surface 63 and the inner end surface 64 of the glass substrate 6, so that the inner end surface and the outer end surface are ground, and the edge portions are chamfered. Moreover, a chamfering process is performed using the same configuration in a method of beveling a wafer disclosed in Japanese Patent Application Laid-open No. H9-181021.

However, in the conventional chamfering method, as shown in FIG. 11, a portion a that is in contact with the edge portion of the glass substrate 6 is intensively worn by friction with the edge portion. As a result, a continuous concave line is formed over the whole circumference of the tapered surface 71b of the grinding groove 71a of the rotary grindstone 71. Every time such a line is formed on the tapered surface 71b, it is necessary to change the grinding groove 71a used for grinding the glass substrate 6 to the grinding groove 71a arranged at a lower level, or to perform dressing on the rotary grindstone 71. Thus, in the conventional chamfering method, maintenance of the grindstone is considerably time consuming. Moreover, in the conventional chamfering method, there is a problem that chipping can easily occur on a chamfered portion and a main surface of the glass substrate 6, and scratches can be easily formed in a stripe pattern on a chamfered portion formed by grinding. Especially, because a glass substrate to be used as an information recording medium needs to be processed with an extremely high precision, a failure to finish a ground surface or a boundary between a ground surface and a substrate surface has been a serious problem.

SUMMARY OF THE INVENTION

It is an object of the present invention to at least partially solve the problems in the conventional technology.

According to an aspect of the present invention, there is provided a method of manufacturing a disk substrate including forming a disk substrate; and chamfering an outer edge of the disk substrate by bringing an end surface of a cylindrical-shaped outer chamfering grindstone having a hollow portion on its end into contact with the outer edge such that the hollow portion faces the outer edge while rotating each of the outer chamfering grindstone and the disk substrate.

According to another aspect of the present invention, there is provided a method of manufacturing a disk substrate including forming a disk substrate having a circular hole at its center; and chamfering an inner edge of the disk substrate by bringing an end surface of a cylindrical-shaped inner chamfering grindstone having a hollow portion on its end into contact with the inner edge such that the hollow portion faces the inner edge while rotating each of the inner chamfering grindstone and the disk substrate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a method of manufacturing a disk substrate according to the present invention will be described in detail with reference to the drawings. The present invention is not limited to the embodiment.

Figure 1:
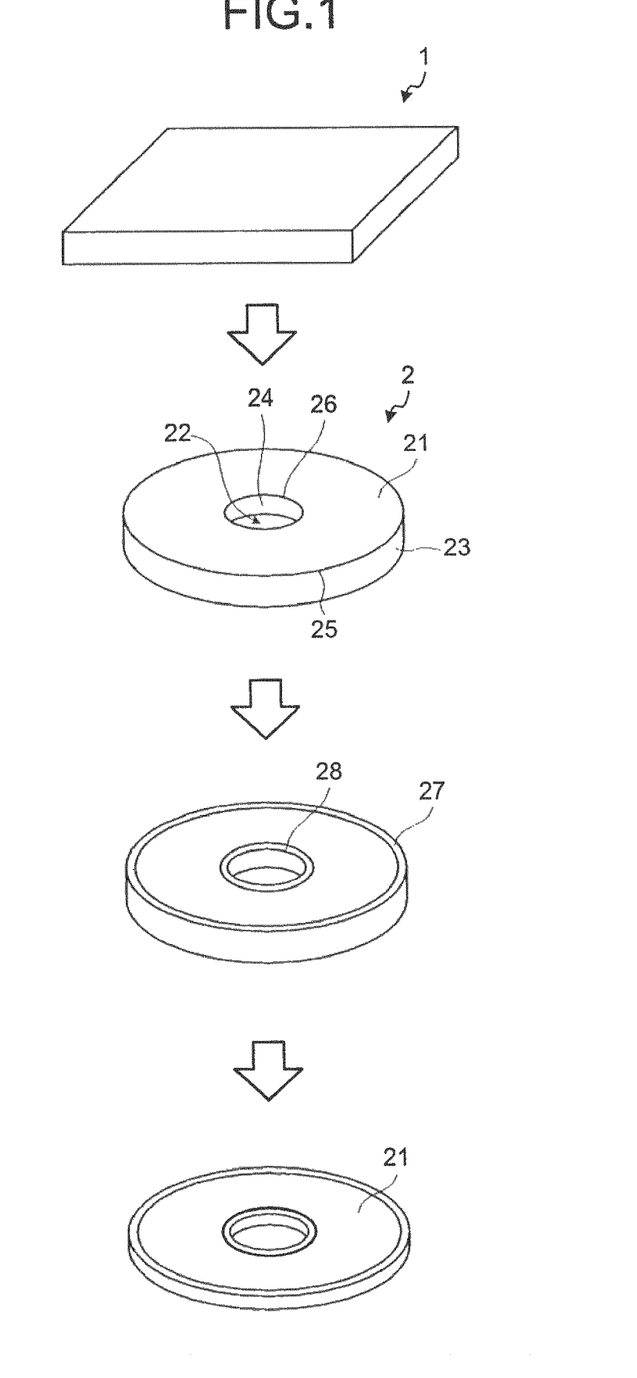
FIG. 1 is a diagram illustrating a method of manufacturing a disk substrate according to an embodiment of the present invention.

FIG. 1 is a diagram illustrating a method of manufacturing a disk substrate according to the embodiment of the present invention. The embodiment is related to a method of manufacturing a disk-shaped glass substrate having a circular hole at its center, i.e., a doughnut-shaped glass substrate. First, a glass plate 1 having a predetermined thickness is manufactured by a well known method, such as a float method, a downdraw method, a fusion method, or a redraw method. Coring of the glass plate 1 is performed by using a well known coring grindstone, so that a doughnut-shaped glass substrate 2 is formed. The glass substrate 2 includes main surfaces 21 on its upper and lower sides, and has a circular hole 22 formed at the center of the glass substrate 2. Reference numerals 23, 24, 25, and 26 denote an outer end surface, an inner end surface, an outer edge, and an inner edge, respectively. Next, the outer end surface 23 and the inner end surface 24 of the glass substrate 2 are ground, so that the glass substrate 2 is formed into a desired size. After the outer end surface 23 and the inner end surface 24 are polished, the outer edge 25 and the inner edge 26 on the upper and lower sides are chamfered, so that an outer chamfered portion 27 and an inner chamfered portion 28 are formed. After the main surfaces 21 on the upper and lower sides of the glass substrate 2 are ground to form the glass substrate 2 into a desired thickness, the main surfaces 21 on the upper and lower sides are polished, and processes of cleaning and glass reinforcement are performed. Thus, a desired glass substrate is manufactured. The glass substrate is, for example, a doughnut-shaped glass substrate having a thickness of 0.381 mm, an outer diameter of 21.60 mm, and an inner diameter of 6.00 mm, and is used as a magnetic disk of a hard disk drive.

In the embodiment, the outer edge or the inner edge is chamfered by bringing an end surface of a cylindrical-shaped outer chamfering grindstone having a hollow portion or a cylindrical-shaped inner chamfering grindstone having a hollow portion into contact with the outer edge 25 or the inner edge 26 such that the hollow portion of the outer chamfering grindstone or the inner chamfering grindstone faces the outer edge 25 or the inner edge 26 of the glass substrate 2 while rotating the outer chamfering grindstone and the inner chamfering grindstone and the disk substrate. With this method, it is possible to prevent occurrence of chipping on the outer chamfered portion 27 or the inner chamfered portion 28 and the main surface 21, and to prevent occurrence of damage on the outer chamfered portion 27 or the inner chamfered portion 28. Thus, it is possible to manufacture a disk substrate having a high-finished chamfered portion. The outer chamfering grindstone and the inner chamfering grindstone will be described later.

Figure 2:
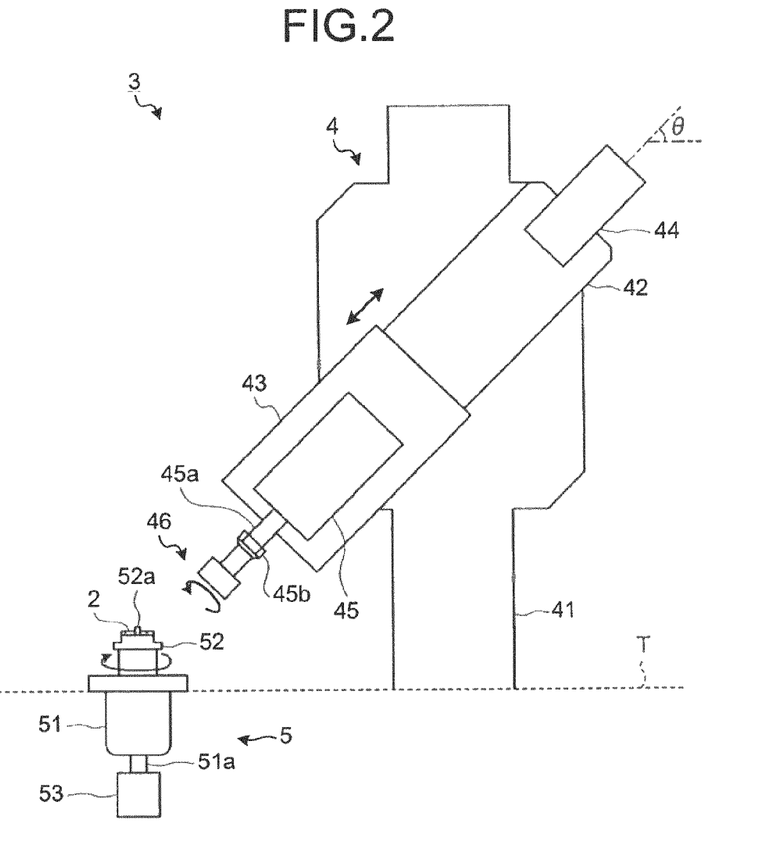
FIG. 2 is a schematic diagram of a chamfering machine used in the embodiment of the present invention.

In the following description, the chamfering process will be concretely explained. FIG. 2 is a schematic diagram of a chamfering machine that is used in the chamfering process according to the embodiment. A chamfering machine 3 includes a grindstone driving unit 4 and a substrate-rotation driving unit 5.

The grindstone driving unit 4 includes a grindstone rotating motor 45, a grindstone moving motor 44, and a slide mechanism 43. The grindstone rotating motor 45 rotates an outer chamfering grindstone 46. The grindstone moving motor 44 moves the grindstone rotating motor 45 back and forward, thereby causing the outer chamfering grindstone 46 to be in contact with the outer edge 25 of the glass substrate 2. The slide mechanism 43 includes the grindstone rotating motor 45.

The grindstone driving unit 4 includes a supporting member 41 that extends upward from a work table T. An attachment plate 42 for attachment of the grindstone moving motor 44 and the slide mechanism 43 is mounted on the supporting member 41 such that the attachment plate 42 is arranged obliquely in its longitudinal direction. The attachment plate 42 is rotatably supported at its central portion with respect to the supporting member 41, so that a tilt angle θ in the longitudinal direction can be adjusted. The attachment plate 42 is locked at a predetermined tilt angle θ by a locking device (not shown).

An output shaft 45a of the grindstone rotating motor 45 is connected to the outer chamfering grindstone 46 via a collet chuck 45b.

Meanwhile, as shown in FIG. 2, the substrate-rotation driving unit 5 includes a substrate rotating motor 53 and a spindle unit 51. Rotary torque is transmitted from the substrate rotating motor 53 to the spindle unit 51, and thereby the spindle unit 51 rotates the glass substrate 2. The spindle unit 51 is fixed to the work table T such that a rotation shaft 51a of the spindle unit 51 extends in the vertical direction. The spindle unit 51 includes a substrate stage 52. The glass substrate 2 is placed on the upper surface of the substrate stage 52.

The substrate stage 52 is mounted on an end of the rotation shaft 51a of the spindle unit 51, and an insertion guide rod 52a is arranged at the center of the substrate stage 52 in a standing manner. The insertion guide rod 52a is inserted into the circular hole 22 of the glass substrate 2, so that a position of the glass substrate 2 is determined. Fixation of the glass substrate 2 to the substrate stage 52 can be achieved by a pressing unit that presses the main surface 21 on the upper side of the glass substrate 2 from above, or by a negative-pressure generating device that causes the main surface 21 on the lower side of the glass substrate 2 to stick through an air intake opening formed on the upper surface of the substrate stage 52.

Figure 3:
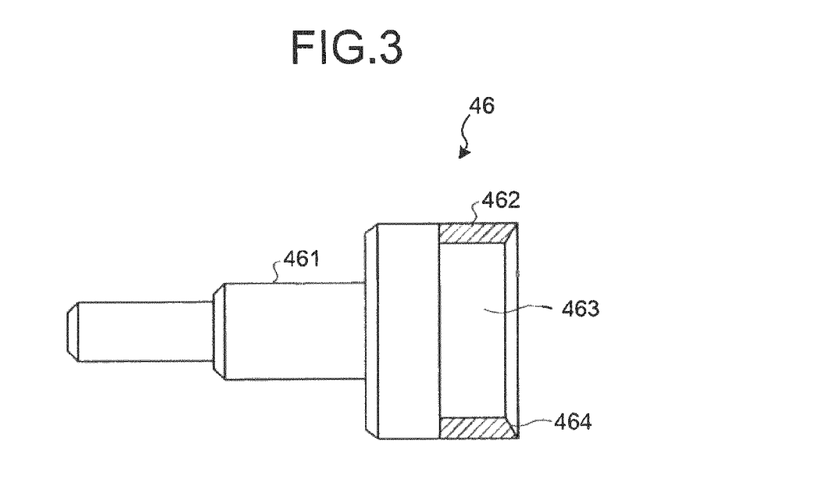
FIG. 3 is a partial cross section of an outer chamfering grindstone.

In the following description, the outer chamfering grindstone will be explained. As shown in FIG. 3, the outer chamfering grindstone 46 includes a grindstone 462 and a grindstone shaft 461. The grindstone 462 grinds the outer edge 25 of the glass substrate 2 and it is fixed to an end of the grindstone shaft 461. The grindstone shaft 461 is connected to the output shaft 45a of the grindstone rotating motor 45. The grindstone 462 is fixed around the same axis as the grindstone shaft 461 is.

The end surface 464 of the outer chamfering grindstone 46 is concavely curved and tilted such that an axial length of the outer chamfering grindstone 46 increases from an innermost radius of the outer chamfering grindstone 46 to an outermost radius of the outer chamfering grindstone 46.

In other words, the end surface 464 is declined from the outer end surface edge to the inner end surface edge such that an entire length of the end surface 464 between the outer end surface edge and the inner end surface edge remains in contact with the outer edge of the substrate 2 during the chamfering.

Figure 4:
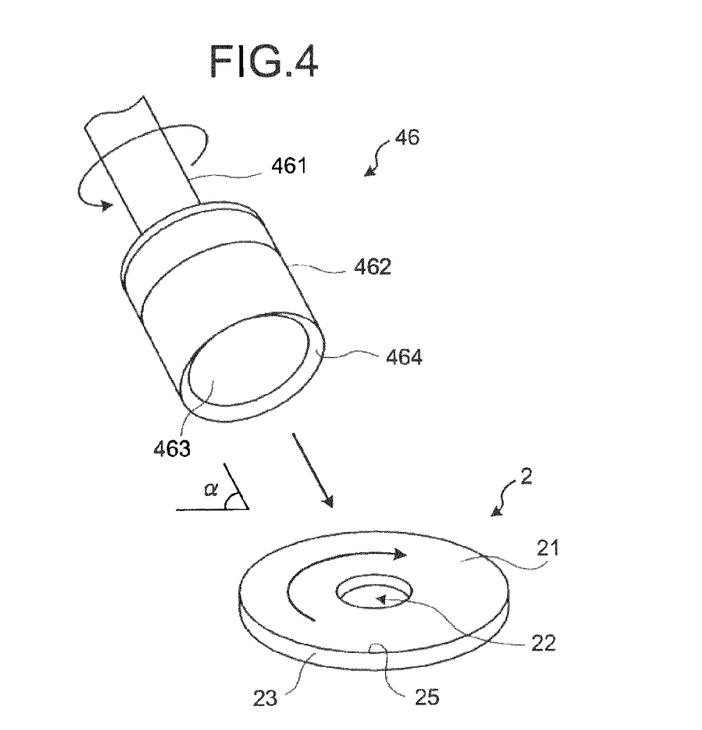
FIG. 4 is a diagram illustrating how the outer chamfering grindstone is pressed against a glass substrate.

The grindstone 462 has a hollow portion 463, and has a cylindrical outer shape. An end surface 464 of the grindstone 462 is used as a grinding surface. As shown in FIG. 4, the end surface 464 is a tilted surface that opens to the outer diameter side toward a distal end and is curved inward making a concave tilted surface, so that the substantially whole of the end surface 464 from the outer diameter side to the inner diameter side is in contact with the outer edge 25 when a rotational center axis of the grindstone is tilted at a predetermined angle α with respect to the main surface 21 of the glass substrate 2 and the end surface 464 is in contact with the outer edge 25 such that the hollow portion 463 of the grindstone 462 faces the outer edge 25 of the glass substrate 2. Furthermore, abrasive grain, such as diamond abrasive grain, is adhered on the end surface 464.

Next, a method of chamfering the glass substrate 2 by the chamfering machine 3 will be explained. To perform chamfering, first, the glass substrate 2 is placed on the substrate stage 52. After the glass substrate 2 is firmly attached to the substrate stage 52, the substrate rotating motor 53 is driven to rotate the substrate stage 52 included in the spindle unit 51. As a result, the glass substrate 2 is rotated around the circular hole 22.

Next, as shown in FIG. 4, the grindstone moving motor 44 is driven to move the outer chamfering grindstone 46 forward to a predetermined position in the state that the grindstone rotating motor 45 is driven to rotate the outer chamfering grindstone 46, so that the end surface 464 of the grindstone 462 is pressed against the outer edge 25 of the glass substrate 2. Accordingly, the outer edge 25 is ground and chamfered. A rotational direction of the outer chamfering grindstone 46 and a rotational direction of the glass substrate 2 are set such that a speed at which the outer chamfering grindstone 46 and the glass substrate 2 slide against each other becomes faster.

Figure 5:
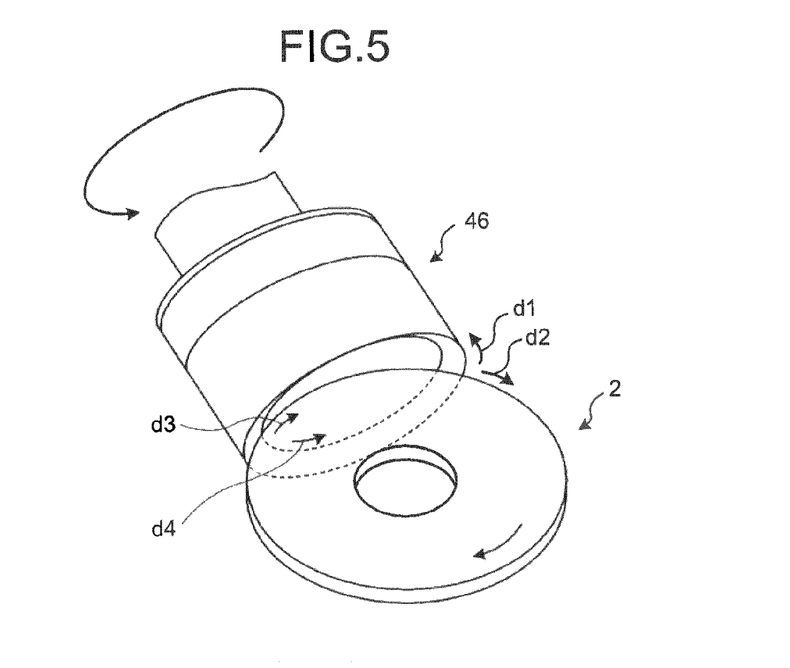
FIG. 5 is a perspective view illustrating a state in which the outer chamfering grindstone is in contact with the glass substrate.

As shown in FIG. 5, the end surface 464 is in contact with the outer edge 25 such that the hollow portion 463 of the grindstone 462 faces the outer edge 25 of the glass substrate 2. Because the end surface 464 of the grindstone 462 is a tilted surface that is curved inward making a concave tilted surface, the substantially whole of the end surface 464 from the outer diameter side to the inner diameter side is in contact with the outer edge 25. Therefore, because a large area of the grindstone can be used for grinding the glass substrate 2, the grinding can be effectively performed, and a time required for the chamfering process can be shortened. Furthermore, directions d2 and d3 in which the outer edge 25 is rotated are nonparallel to directions d1 and d4 in which the end surface 464 of the grindstone 462 is rotated, i.e., the directions d2 and d3 cross the directions d1 and d4. As a result, a line is not formed in a specific direction on the end surface 464 of the grindstone 462. Moreover, scratches are not easily formed in a stripe pattern on the outer chamfered portion 27 of the glass substrate 2.

Figure 6:
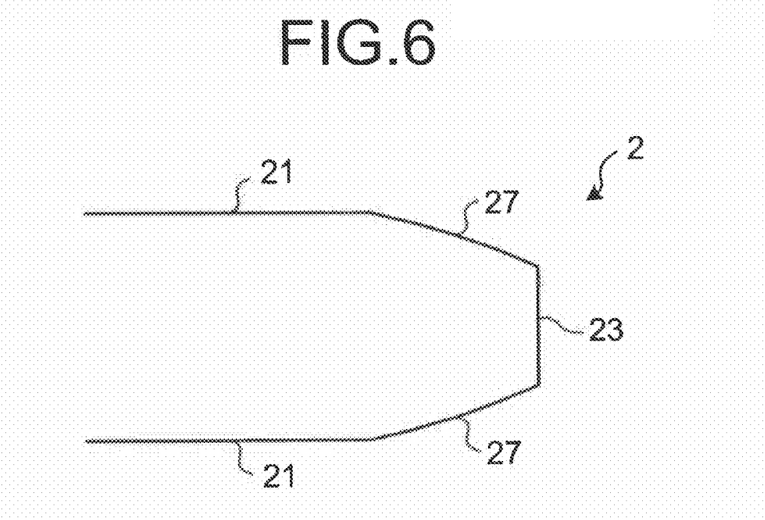
FIG. 6 is a cross section of an outer end portion of the glass substrate on which chamfering has been performed.

The glass substrate 2 is ground by the end surface 464 of the grindstone 462 simultaneously on two sides of the glass substrate 2 with the hollow portion 463 interposed therebetween. A grinding direction in which a ground portion on the right side of FIG. 5 is ground by the end surface 464 is an obliquely upward direction obtained by combining the direction d1 and the direction d2 with respect to the glass substrate 2. On the other hand, a grinding direction in which a ground portion on the left side of FIG. 5 is ground by the end surface 464 is an obliquely downward direction obtained by combining the direction d3 and the direction d4 with respect to the glass substrate 2. Thus, the grinding directions on the ground portions on the left and right sides of FIG. 5 are different from each other. As a result, self-dressing effect is produced on the end surface 464 of the grindstone 462, and therefore the grindstone is not damaged. Furthermore, because a circular line is not formed on the end surface 464, chipping does not easily occur. Moreover, because the end surface 464 of the grindstone 462 is a tilted surface that is curved inward making a concave tilted surface, the outer chamfered portion 27 of the glass substrate 2 ground by the grindstone 462 is formed into a moderately curved surface that is curved outward as shown in FIG. 6. Thus, chipping does not easily occur at the boundary between the main surface 21 and the outer chamfered portion 27 of the glass substrate 2, and reliability, durability, and process yield of the glass substrate 2 can be further improved. Furthermore, even if scratches are formed in a stripe pattern on the ground portion on the left side of the glass substrate 2, the scratches are eliminated on the ground portion on the right side of the glass substrate 2. Thus, the finishing precision of the outer chamfered portion 27 can be improved.

Because the substantially whole of the end surface 464 of the grindstone 462 from the outer diameter side to the inner diameter side is in contact with the outer edge 25, the end surface 464 becomes uniformly worn if the grinding is continuously performed by using the grindstone 462. Therefore, the curved shape of the end surface 464 does not change. As a result, the chamfering can be performed under steady conditions at any time, and the maintenance of the grindstone 462 can be further facilitated.

After the chamfering of the outer edge 25 on the upper side of the glass substrate 2 is finished, the glass substrate 2 is turned over, and then the same chamfering process is performed. Thus, the chamfering of the outer edges 25 on the upper and lower sides of the glass substrate 2 is completed.

Next, chamfering of the inner edge 26 of the glass substrate 2 will be explained. The chamfering of the inner edge 26 of the glass substrate 2 can be performed by the same chamfering machine as that shown in FIG. 1 in which the chamfering grindstone and the substrate stage are replaced by those for chamfering the inner edge.

Figure 7:
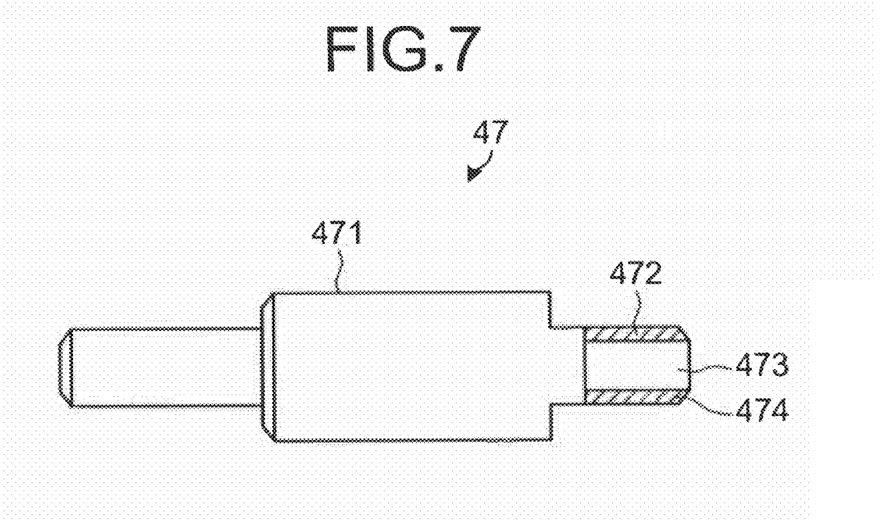
FIG. 7 is a partial cross section of an inner chamfering grindstone.

As shown in FIG. 7, an inner chamfering grindstone 47 used for chamfering the inner edge 26 of the glass substrate 2 includes a grindstone 472 and a grindstone shaft 471. The grindstone 472 grinds the inner edge 26 of the glass substrate 2, and it is fixed to an end of the grindstone shaft 471. The grindstone shaft 471 is connected to the output shaft 45a of the grindstone rotating motor 45. The grindstone 472 is fixed around the same axis as the grindstone shaft 471 is.

The end surface 474 of the inner chamfering grindstone 47 is convexly curved and tilted such that an axial length of the inner chamfering grindstone 47 decreases from an innermost radius of the inner chamfering grindstone 47 to an outermost radius of the inner chamfering grindstone 47.

In other words, the end surface 474 is declined from the inner end surface edge to the outer end surface edge such that an entire length of the end surface 474 between the outer end surface edge and the inner end surface edge remains in contact with the inner edge 26 of the substrate 2 during the chamfering of the inner edge 26 of the substrate 2.

Figure 8:
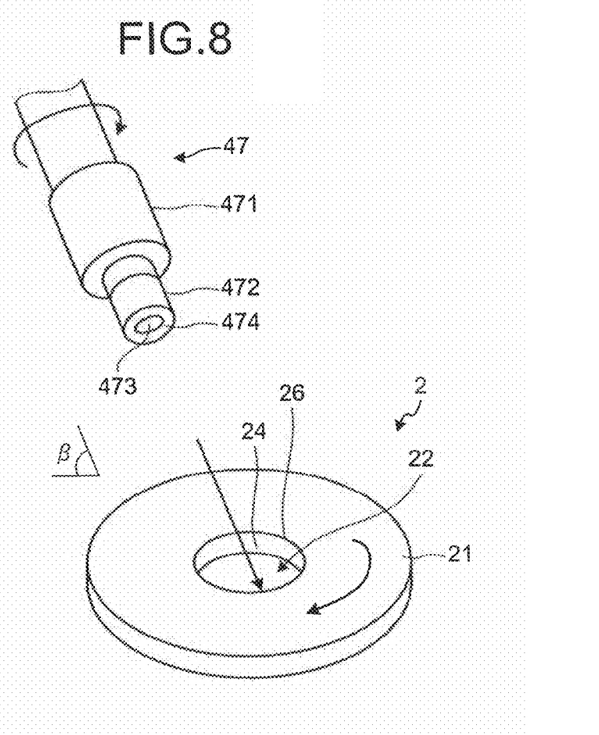
FIG. 8 is a diagram illustrating how the inner chamfering grindstone is pressed against the glass substrate.

The grindstone 472 has a hollow portion 473 formed therein, and has a cylindrical outer shape. An end surface 474 of the grindstone 472 is used as a grinding surface. As shown in FIG. 8, the end surface 474 is tapered like a truncated cone side surface, and has a tilted surface that is curved outward making a convex tilted surface, so that the substantially whole of the end surface 474 from the outer diameter side to the inner diameter side is in contact with the inner edge 26 when a rotational center axis of the grindstone is tilted at a predetermined angle β with respect to the main surface 21 of the glass substrate 2, and the end surface 474 is in contact with the inner edge 26 such that the hollow portion 473 of the grindstone 472 faces the inner edge 26 of the glass substrate 2.

Furthermore, abrasive grain, such as diamond abrasive grain, is adhered on the end surface 474.

On the other hand, as for a substrate stage arranged on an end of the rotation shaft 51*a* of the spindle unit 51, a cylindrical wall is mounted around the outer circumference of the substrate stage in a standing manner to guide the outer end of the glass substrate 2 to perform positioning of the glass substrate 2. A concave portion is formed on a central portion of the substrate stage, so that an end of the grindstone 472 does not interfere with the substrate stage when the chamfering is performed. It is possible to employ the substrate stage in which the glass substrate 2 is attached to the upper surface of the substrate stage by the pressing unit or the negative-pressure generating device as described above.

Chamfering of the inner edge 26 of the glass substrate 2 is basically performed in the same manner as that for chamfering the outer edge 25 as described above. Specifically, the substrate rotating motor 53 is driven in the state that the glass substrate 2 is placed on the substrate stage, so that the glass substrate 2 is rotated around the circular hole 22. Then, as shown in FIG. 8, the grindstone moving motor 44 is driven to move the inner chamfering grindstone 47 forward to a predetermined position, so that the end surface 474 of the grindstone 472 is pressed against the inner edge 26 of the glass substrate 2. As a result, the inner edge 26 is ground and chamfered. A rotational direction of the inner chamfering grindstone 47 and a rotational direction of the glass substrate 2 are set such that a speed at which the inner chamfering grindstone 47 and the glass substrate 2 slide against each other becomes faster.

Figure 9:
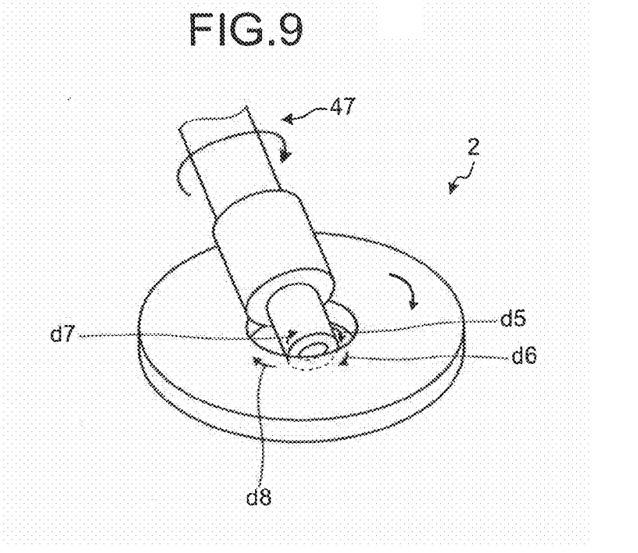
FIG. 9 is a perspective view illustrating a state in which the inner chamfering grindstone is in contact with the glass substrate.

As shown in FIG. 9, the end surface 474 is in contact with the inner edge 26 such that the hollow portion 473 of the grindstone 472 faces the inner edge 26 of the glass substrate 2. Because the end surface 474 of the grindstone 472 is a tilted surface that is curved outward making a convex tilted surface, the substantially whole of the end surface 474 from the outer diameter side to the inner diameter side is in contact with the inner edge 26. As a result, because a large area of the grindstone can be used for grinding the glass substrate 2, the grinding can be effectively performed, and a time required for the chamfering process can be shortened. Furthermore, directions d6 and d8 in which the inner edge 26 is rotated are nonparallel to directions d5 and d7 in which the end surface 474 of the grindstone 472 is rotated, i.e., the directions d6 and d8 cross the directions d5 and d7. As a result, a line is not formed in a specific direction on the end surface 474 of the grindstone 472. Moreover, scratches are not easily formed in a stripe pattern on the inner chamfered portion 28 of the glass substrate 2.

The glass substrate 2 is ground by the end surface 474 of the grindstone 472 simultaneously on two sides of the glass substrate 2 with the hollow portion 473 interposed therebetween. A grinding direction in which a ground portion on the right side of FIG. 9 is ground by the end surface 474 is an obliquely downward direction obtained by combining the direction d5 and the direction d6 with respect to the glass substrate 2. On the other hand, a grinding direction in which a ground portion on the left side of FIG. 9 is ground by the end surface 474 is an obliquely upward direction obtained by combining the direction d7 and the direction d8 with respect to the glass substrate 2. Thus, the grinding directions on the ground portions on the left and right sides of FIG. 9 are different from each other. As a result, self-dressing effect is produced on the end surface 474 of the grindstone 472, and therefore the grindstone is not damaged. Furthermore, because a circular line is not formed on the surface of the grindstone, chipping does not easily occur. Furthermore, even if scratches are formed in a stripe pattern on the ground portion on the left side of the glass substrate 2, the scratches are eliminated on the ground portion on the right side of the glass substrate 2. Thus, the finishing precision of the inner chamfered portion 28 can be improved.

Because the substantially whole of the end surface 474 of the grindstone 472 from the outer diameter side to the inner diameter side is in contact with the inner edge 26, the end surface 474 becomes uniformly worn if the grinding is continuously performed by using the grindstone 472. Therefore, the curved shape of the end surface 474 does not change. As a result, the chamfering can be performed under steady conditions at any time, and the maintenance of the grindstone 472 can be further facilitated.

After chamfering of the inner edge 26 on the upper side of the glass substrate 2 is finished, the glass substrate 2 is turned over, and then the same chamfering process is performed. Thus, the chamfering of the inner edges 26 on the upper and lower sides of the glass substrate 2 is completed.

In the above embodiment, the chamfering machine for chamfering the outer edge and the chamfering machine for chamfering the inner edge are separately arranged. However, the chamfering machine can be used in such a manner that the grindstone driving unit 4 and the substrate-rotation driving unit 5 are used in a shared manner, and the chamfering grindstone and the substrate stage are replaced. The chamfering machine can be also used in such a manner that the substrate-rotation driving unit for chamfering the outer edge and the substrate-rotation driving unit for chamfering the inner edge are mounted on the work table T, so that the grindstone driving unit 4 is used in a shared manner. In such a case, the chamfering grindstone is simply replaced.

Although the chamfering grindstone is moved forward and backward to be in contact with the glass substrate in the above embodiment, it can be configured such that the glass substrate that is rotating is moved forward and backward to be in contact with the chamfering grindstone. A shape of the tilted end surface of the grindstone can be a straight tilted surface or a curved surface at a desired curvature radius depending on requirement for a chamfered shape. Moreover, the end surface can have a degree of curvature depending on a tilt angle of a rotational axis of the grindstone.

The present invention is not limited to chamfering of a magnetic disk of a hard disk drive. The present invention can be applied to chamfering of other types of glass substrate to be used as a recording medium, such as an optical disk and a magnetic optical disk, a disk-shaped glass substrate having no circular hole at its center, a semiconductor wafer that is made of monocrystal or compound semiconductor and is used in manufacturing a semiconductor device, a ferroelectric wafer used in manufacturing a piezoelectric element, or the like.

Furthermore, the present invention can be applied to a round chamfering by combining with a unit that can continuously change a tilt angle of the grindstone driving unit around a contact point between the grindstone and the glass substrate, so that the tile angle is continuously changed during a chamfering operation. Moreover, the present invention can be applied to chamfering of a rectangular substrate used for an LCD, a PDP, or the like, by combining with a unit that moves the glass substrate and the grindstone relatively and linearly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a disk substrate, comprising:
    forming a disk substrate; and
    chamfering an outer edge of the disk substrate by bringing an end surface of a cylindrical-shaped outer chamfering grindstone having a hollow portion within the end surface into contact with the outer edge such that the hollow portion faces the outer edge while rotating each of the outer chamfering grindstone and the disk substrate, wherein
    the end surface of the outer chamfering grindstone is concavely curved and tilted such that an axial length of the outer chamfering grindstone increases from an innermost radius of the outer chamfering grindstone to an outermost radius of the outer chamfering grindstone.

2. A method of manufacturing a disk substrate, the method comprising:
    forming a disk substrate having a circular hole at its center; and
    chamfering an inner edge of the disk substrate by bringing an end surface of a cylindrical-shaped inner chamfering grindstone having a hollow portion within the end surface into contact with the inner edge such that the hollow portion faces the inner edge while rotating each of the inner chamfering grindstone and the disk substrate, wherein
    the end surface of the inner chamfering grindstone is convexly curved and tilted such that an axial length of the inner chamfering grindstone decreases from an innermost radius of the inner chamfering grindstone to an outermost radius of the inner chamfering grindstone.

3. The method according to claim 2, further comprising:
    chamfering an outer edge of the disk substrate by bringing an end surface of a cylindrical-shaped outer chamfering grindstone having a hollow portion within the end surface into contact with the outer edge such that the hollow portion faces the outer edge while rotating each of the outer chamfering grindstone and the disk substrate.

4. The method according to claim 3, wherein the end surface of the outer chamfering grindstone is concavely curved and tilted such that an axial length of the outer chamfering grindstone increases from an innermost radius of the outer chamfering grindstone to an outermost radius of the outer chamfering grindstone.

5. A method of manufacturing a disk substrate, comprising:
    forming a disk substrate; and
    chamfering an outer edge of the disk substrate, the chamfering including:
        bringing an end surface of a cylindrical outer chamfering grindstone into contact with the outer edge of the disk substrate such that the end surface faces the outer edge of the disk substrate while rotating each of the outer chamfering grindstone and the disk substrate, wherein
    the end surface includes a circular cutout portion within edges of the end surface forming an outer end surface edge and an inner end surface edge, and
    the end surface is declined from the outer end surface edge to the inner end surface edge such that an entire length of the end surface between the outer end surface edge and the inner end surface edge remains in contact with the outer edge of the disk substrate during the chamfering.

6. The method according to claim 5, further comprising:
    forming the disk substrate with a circular hole at its center forming an inner edge; and
    chamfering the inner edge of the disk substrate, the chamfering including:
        bringing an end surface of a cylindrical inner chamfering grindstone into contact with the inner edge of the disk substrate such that the end surface faces the inner edge of the disk substrate while rotating each of the inner chamfering grindstone and the disk substrate, wherein
    the end surface includes a circular cutout portion within edges of the end surface forming an outer end surface edge and an inner end surface edge, and
    the end surface is declined from the inner end surface edge to the outer end surface edge such that an entire length of the end surface between the outer end surface edge and the inner end surface edge remains in contact with the inner edge of the disk substrate during the chamfering of the inner edge of the disk substrate.

* * * * *